United States Patent [19]

Spencer

[11] 4,058,257
[45] Nov. 15, 1977

[54] IRRIGATION EMITTER

[76] Inventor: Lloyd Spencer, 220 Patrician Way, Pasadena, Calif. 91105

[21] Appl. No.: 704,048

[22] Filed: July 9, 1976

Related U.S. Application Data

[63] Continuation of Ser. No. 529,712, Dec. 5, 1974, abandoned.

[51] Int. Cl.² ............................................. B05B 1/32
[52] U.S. Cl. ..................................... 239/107; 138/45; 138/111; 239/542
[58] Field of Search ................................ 239/106–109, 239/542, 547, 569, 570, 450; 138/44, 45, 46, 111, 118

[56] References Cited

U.S. PATENT DOCUMENTS

| 2,460,647 | 2/1949 | Miller | 138/45 |
| 2,554,790 | 5/1951 | Miller | 138/43 |
| 3,693,888 | 9/1972 | Rondas et al. | 239/542 X |
| 3,814,377 | 6/1974 | Todd | 239/542 X |

Primary Examiner—Evon C. Blunk
Assistant Examiner—Michael Mar

[57] ABSTRACT

An irrigation emitter including a fixed longitudinally extending passage wall element having a longitudinally extending restricted flow groove therein, and a flexible longitudinally extending passage wall element overlying the fixed wall element and contacting the fixed wall element along its side margins to define therewith a flush passage and adapted to collapse against the fixed wall element to confine flow to the restricted flow groove. One embodiment of the irrigation emitter having a single fixed wall element and flexible wall element forming a single flush passage and restricted flow groove. Another embodiment includes a ring of fixed wall elements and flexible wall elements forming a ring of flush passages and restricted flow grooves which may be modified for axial discharge or deflected discharge, and the grooves arranged for drip flow, or spray flow; and when arranged for spray flow, may be deflected to produce a segmental spray of selected circumferential extent.

31 Claims, 27 Drawing Figures

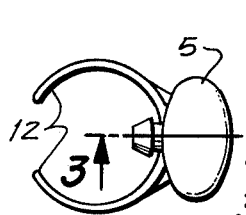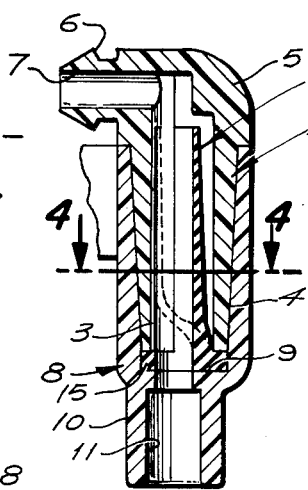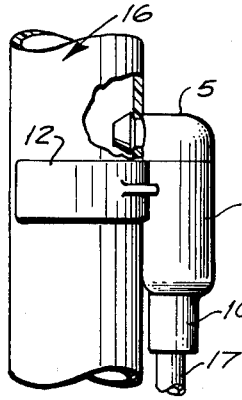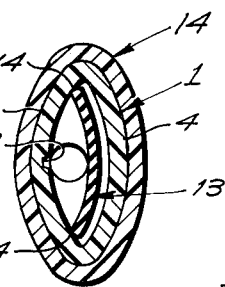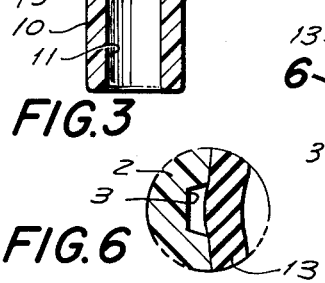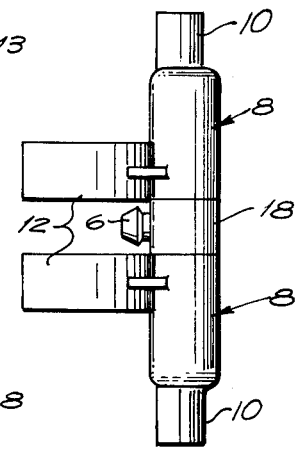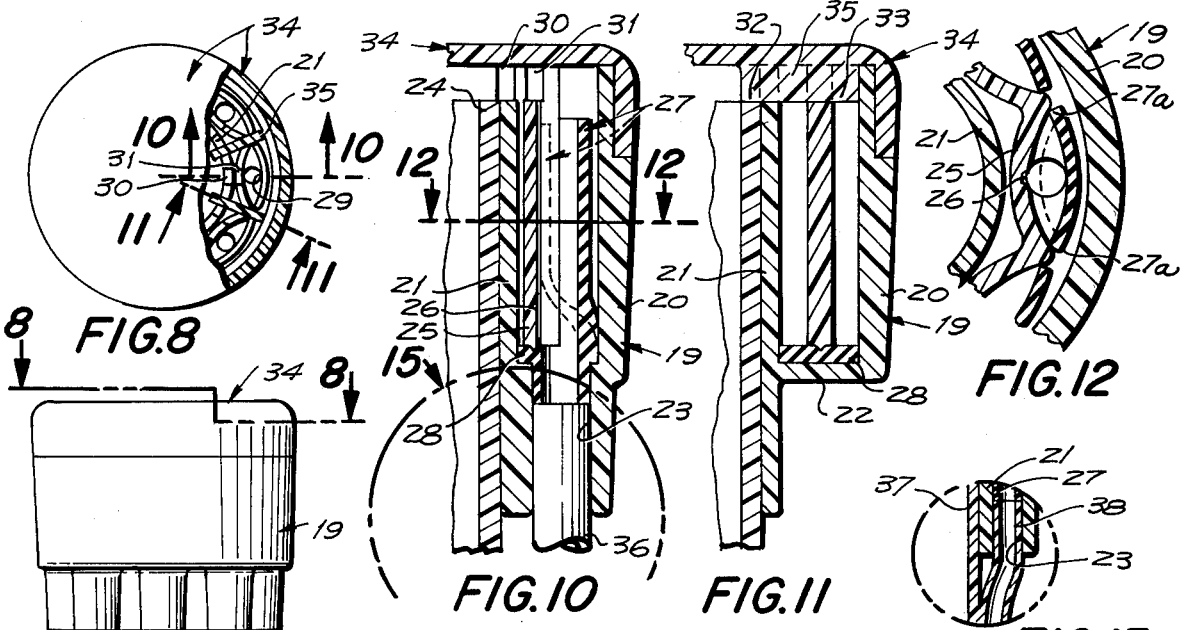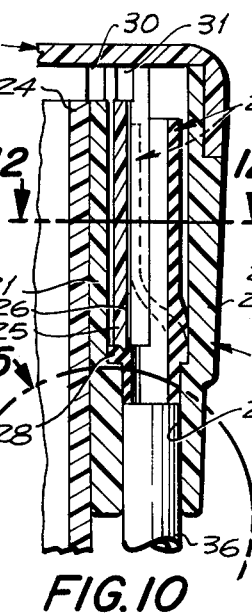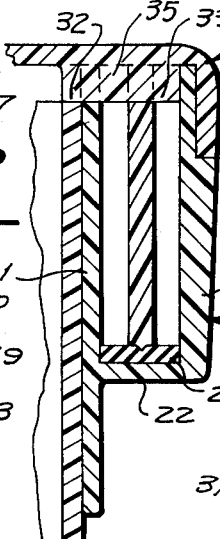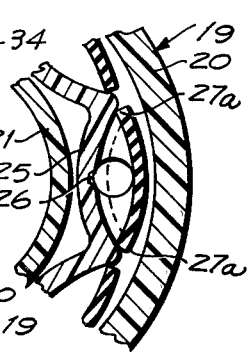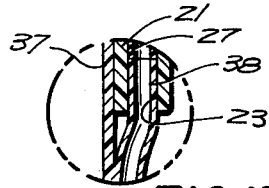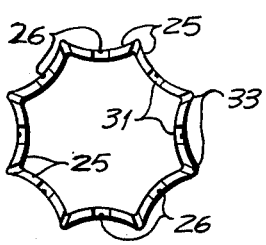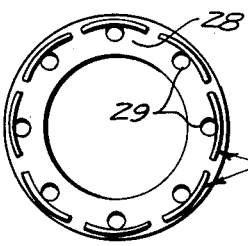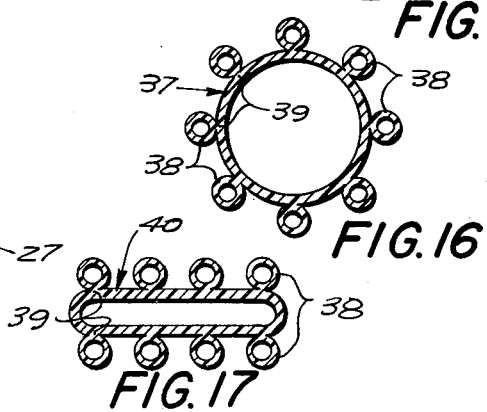

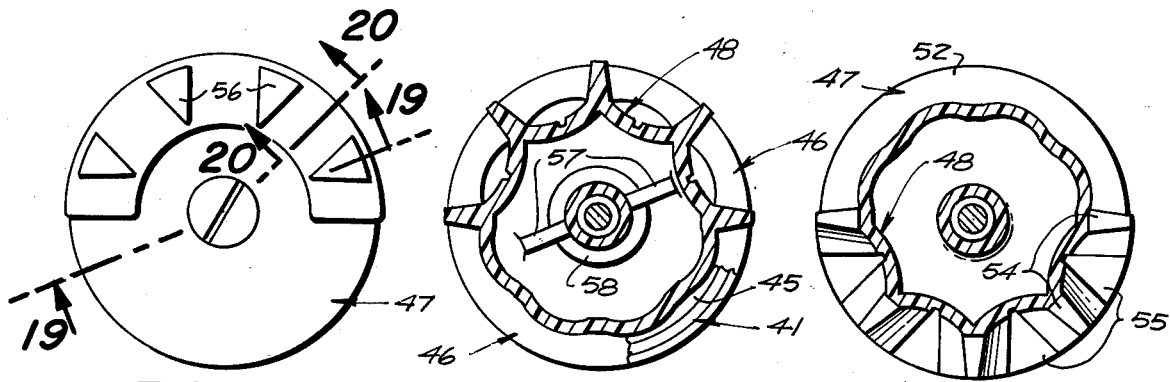
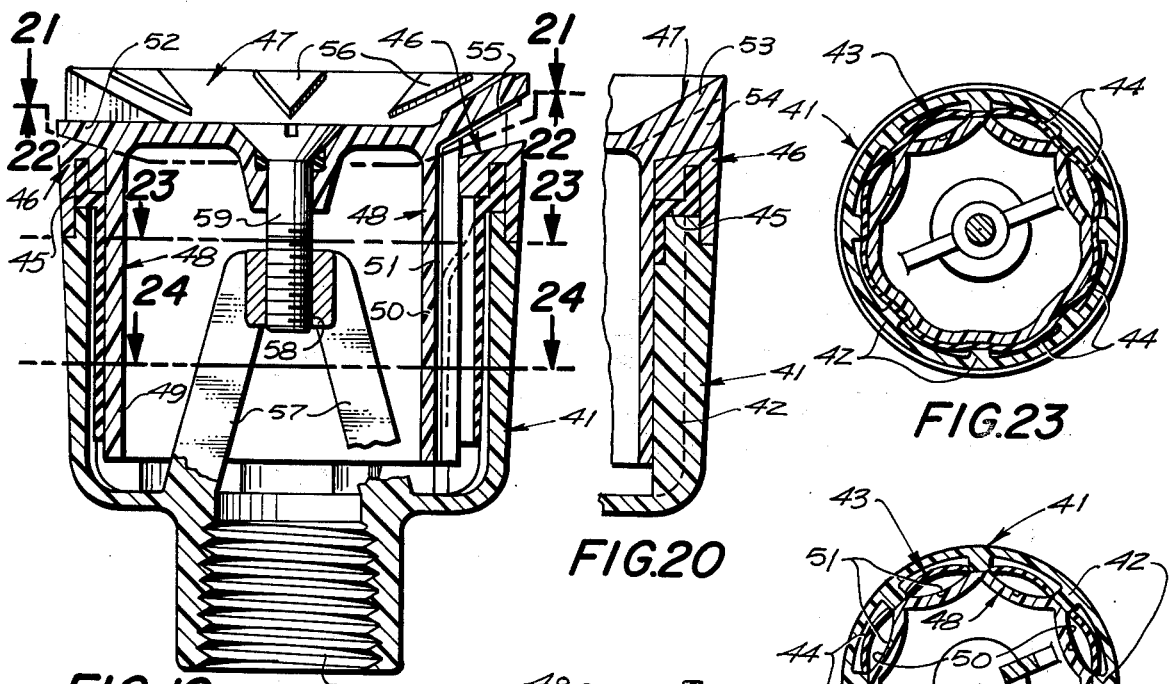
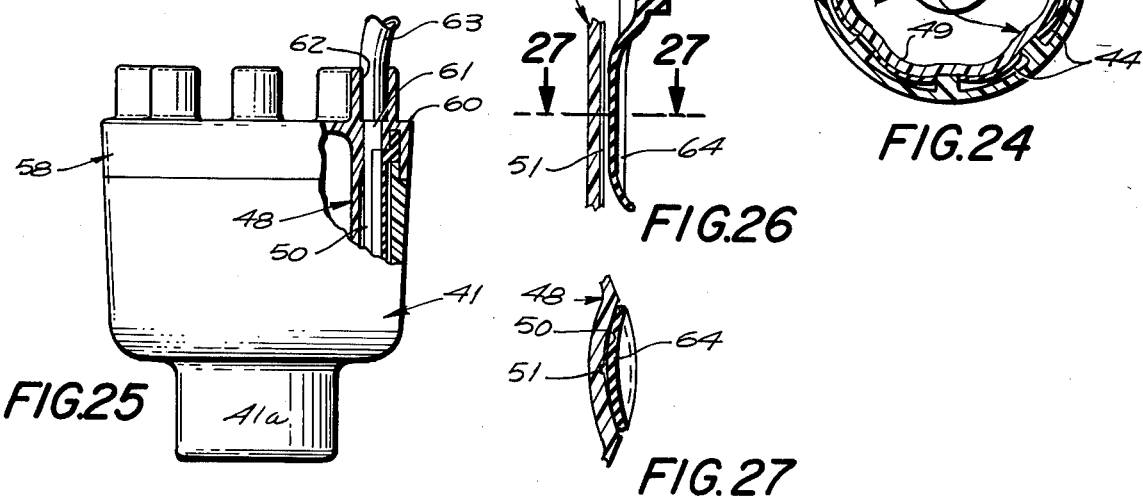

IRRIGATION EMITTER

This is a continuation, of application Ser. No. 529,712, filed Dec. 5, 1974, now abandoned.

BACKGROUND OF THE INVENTION

The present invention is related to my previous U.S. Pat. No. 3,767,124 and like the preceding patent accomplishes self-flushing when the water supply is first turned on, and during final flow when the water is shut-off.

SUMMARY OF THE INVENTION

The present invention is directed to an irrigation emitter which is summarized in the following objects:

First, to provide an irrigation emitter wherein a fixed passage wall element having a central restricted flow groove confronts a flexible passage wall element contacting the fixed element along its side margins to form with the fixed element, a flush passage, when subjected to minimal pressure at the start and finish of a flow cycle and to form a restricted passage confined to the groove when subjected to increased pressure during a flow cycle.

Second, to provide an irrigation emitter, an embodiment of which is arranged for connection to a flow line through a lateral port and includes a yieldable retainer clip to secure the emitter in essentially parallel contiguous relation with the flow line, this embodiment having a single flush passage and corresponding restricted flow passage or a pair of coaxial oppositely directed passages.

Third, to provide an irrigation emitter wherein other embodiments include a set of fixed and flexible passage forming elements arranged in a circle.

Fourth, to provide an irrigation emitter as indicated in the previous object which with minimum change in parts may be arranged for drip flow, trickle flow, mist spray or sprinkler spray during an irrigation flow cycle and, in each case, undergoes flush flow at the start and finish of a flow cycle.

Fifth, to provide an irrigation emitter, as indicated in the preceding object, wherein when arranged for mist or sprinkler spray discharge may also be arranged to produce spray patterns arranging from a segmental spray to a full circle spray.

Sixth, to provide an irrigation emitter which utilizes a novely arranged irrigation line and a ring of removably attached distributor tubes.

DESCRIPTION OF THE FIGURES

FIG. 1 is an end view of one embodiment of the irrigation emitter having a single emitter outlet.

FIG. 2 is a side view thereof shown in position on an irrigation line.

FIG. 3 is an enlarged longitudinal sectional view thereof taken through 3—3 of FIG. 1.

FIG. 4 is a transverse sectional view thereof taken through 4—4 of FIG. 3 showing the emitter in its flush condition.

FIG. 5 is a sectional view corresponding to FIG. 4 showing the emitter in drip condition.

FIG. 6 is a further enlarged sectional view taken through circle 6 of FIG. 5 showing the drip passage.

FIG. 7 is a side view corresponding to FIG. 2 showing a further embodiment wherein the emitter has two oppositely directed outlets.

FIG. 8 is an end view taken through 8—8 of FIG. 9 showing partly in section, a further embodiment of the irrigation emitter wherein a plurality of emitter outlets are arranged in a circle.

FIG. 9 is a side view thereof.

FIGS. 10 and 11 are enlarged fragmentary sectional views thereof taken respectively through 10—10 and 11—11 of FIG. 8.

FIG. 12 is a fragmentary sectional view taken through 12—12 of FIG. 10.

FIG. 13 is an end view of the fixed wall member shown in FIGS. 8, 10, 11 and 12.

FIG. 14 is an end view of the flexible wall member shown in FIGS. 8, 10, 11 and 12.

FIG. 15 is a reduced fragmentary sectional view corresponding to the region within circle 15 of FIG. 10, showing a manner of connection to a supply line having a set of integral distributor lines.

FIG. 16 is a transverse sectional view of a supply line of the type indicated in FIG. 15; that is, having a ring of distributor tubes.

FIG. 17 is a similar transverse sectional view of a modified supply line which, when free of pressure, occupies a flat shape.

FIG. 18 is a plan view of a further embodiment of the irrigation emitter arranged for mist or sprinkler discharge to produce a segmental spray pattern.

FIG. 19 is an enlarged transverse sectional view thereof taken through 19—19 of FIG. 18.

FIG. 20 is an enlarged fragmentary transverse sectional view thereof taken through 20—20 of FIG. 18.

FIGS. 21, 22, 23 and 24 are transverse sectional views at the same scale as FIG. 18 taken respectively through 21—21, 22—22, 23—23 and 24—24 of FIG. 19.

FIG. 25 is a side view partly in section of a further embodiment utilizing most of the elements of the embodiment shown in FIGS. 18 through 24 but which is adapted to produce a drip discharge from a ring of outlets.

FIG. 26 is a fragmentary sectional view corresponding to FIG. 19, but at a reduced scale, illustrating an embodiment wherein the fixed wall and flexible wall of the flush passage are curved in the same direction.

FIG. 27 is a sectional view thereof taken through 27—27 of FIG. 26.

Referring to FIGS. 1 through 5, the embodiment of the irrigation emitter here illustrated includes a tubular inner shell 1 of essentially rigid plastic material capable of being injection molded. The shell forms a fixed concave passage wall 2 having a centered longitudinally extending drip or minimum flow groove 3. Joined to the side margins of the wall 2 is a confronting concave wall 4, the two walls forming a longitudinally extending cavity which is essentially almond or oval shaped in cross section. Continuing from one end of the inner member is an integral cap 5 having a short laterally extending flanged stem 6, forming an inlet passage 7.

Initially slidably fitting the inner shell 1, is an outer shell 8, also molded of essentially rigid plastic material which is cemented or otherwise permanently attached thereto. The end of the shell 8 opposite from the cap 5 is provided with an internal shoulder 9 confronting the end of the inner shell 1 and continues to form a tubular extension 10 forming an outlet passage 11. Extending laterally from the outer shell 8 in the same direction as the stem 6 is a pair of curved arms forming a clip 12.

Received in the inner shell 1 is a longitudinally extending concave resilient passage wall 13 formed of rubber or other elastomer and arranged so that its side edges 14 contact the side margins of the passage wall 2 or nearly so. A clearance space is provided between the resilient wall 13 and the confronting wall 4. The resilient passage wall preferably increases in thickness from the cap end of the inner shell toward the tubular extension 9 and terminates in a perforated flange 15 adapted to be clamped between the shoulder 9 and extremity of the inner shell 1.

Operation of the embodiment irrigation emitter shown in FIGS. 1 through 6 is as follows:

The flanged stem 6 is pressed into a perforation provided in an irrigation tube 16, and the clip 12 is pressed over the tube to secure the emitter in place. When so connected, a passageway is formed through the inlet passage 7, between the fixed and resilient passage walls 2 and 13 and through the outlet passage 11. When water is initially supplied to the irrigation tube; the walls 2 and 13 form a flush passage; however, when the entering pressure rises to between one and three pounds, a differential pressure is created which causes sudden collapse of the resilient wall 13 against the surface of the fixed wall 2 limiting flow to the capacity of the groove 3 as indicated in FIGS. 5 and 6 and by dotted lines in FIG. 3. The size of the groove 3 is predetermined to produce a drip or trickle flow from less than 1 gallon per hour to 3 or more gallons per hour.

Also the shape of the groove 3, thickness and hardness of the resilient wall 13 may be preselected so that the rate of flow through the groove may be constant throughout a wide range of pressures; for example, from 5 pounds per square inch or less to more than 60 pounds per square inch, or if desired a preselected rise or fall in flow may be provided.

Because the effective length of the drip passage formed by the groove and confronting resilient wall may have substantial axial extent, (in the order of ⅜ to a ½ inch or more), accurate control of flow is more readily obtained than if the effective length were substantially less.

Also the substantial width of the flush passage formed between the fixed wall and resilient wall (in the order of ⅜ to a ½ inch) the collapsing force required is minimal thereby increasing the number of emitters which may be provided for an irrigator line of given size and length; while maintaining flush passages of adequate size to minimize the need to filter the irrigation water. The ability to shift from flush flow to drip flow is also enhanced by the fact that the edges of the resilient wall 13 are in essentially free line contact rather than foldably connected to the walls 3 or to side extensions of the resilient wall 13.

In order to minimize entrance of dirt into the outlet passage 11, or to permit placement of the discharge end of the emitter at a desired location, the outlet passage may have an enlarged end to receive a distributor tube 17.

Referring to FIG. 7, should it be desired to provide a pair of outlets, a pair of axially aligned inner shells 1 may be joined to a common connector 18 having a lateral stem 6. A pair of outer shells 8 fit over the inner shells and a pair of clips 12 secure the dual emitter to a flow line.

Referring to FIGS. 8 through 15. The embodiment here illustrated provides a ring of emitters and includes a housing 19 injection molded of rigid or semi-rigid plastic material and having an annular outer wall 20 and an annular inner wall 21 joined thereto by an annular connecting web 22 having a ring of axially directed outlet passages 23. The inner wall 21 receives an end of an irrigation tube 24 which may be cemented or screwthreaded in place.

Fitted between the walls 20 and 21 is an annular fluted member injection molded of rigid or semi-rigid plastic material and forming a ring of integrally connected fixed concave passage walls 25, each having a groove 26 for drip flow. Interposed between the outer wall 20 and fixed passage walls is a ring of inwardly facing concave resilient passage walls 27, formed of rubber or other elastomer, and separated by slits. As described in reference to the first embodiment, the lateral edges 26 of the resilient walls 27a contact or nearly so, the lateral margins of the corresponding fixed walls to form flush passages. The resilient walls 27 are joined at one end by an annular sealing flange 28 which is clamped between the inner end of the fluted member which forms the fixed walls 25. The flange is provided with outlet ports 29 in the form of short tubes extending into the outlet passages 23.

The opposite ends of the inner wall 21 and each fixed wall 25 are provided with entrance notches 30 and 31, and alignment notches 32 and 33 interposed circumferentiallly displaced from the notches 30 and 31, which when radially aligned also position the entrance notches in radial alignment. The housing 19 receives a cap member 34 which is permanently cemented or heat sealed or clamped to the outer wall 20. The cap member 34 is provided with radial webs 35 which fit the alignment notches 32 and 33. Each outlet passage 23 receives a distributor tube 36.

Each emitter formed by a fixed wall 25 and resilient wall 27 functions in the manner of the fixed wall 2 and resilient wall 13 of the first described embodiment. The embodiment shown in FIGS. 8 through 14 may be mounted at the end of an irrigation line or on a riser. If a double ended cap member is substituted for the cap member 34, a pair of housings 19 may extend in opposite directions in the manner of the dual emitter shown in FIG. 7. In this case, the pair of housings 19 serve to connect sections of an irrigation line in end-to-end relation. Also, if fewer outlets for unit length of the irrigation line is required, the cap member 34 may be provided with an extension sleeve to receive the end of the next section of the irrigation line.

In order to simplify installation, particularly when the irrigation line sections are arranged in end-to-end relation, a special irrigation line 37 may be provided as shown in FIGS. 15 and 16. The line 37 is extruded with a ring of distributor tubes 38 integrally attached by severable webs 39. End portions of the tubes are severed as indicated in FIG. 15 for insertion into corresponding outlet passages 23. The inner wall 21 and the outlet passages 23 may have rudimentary grooves to match the component parts of the webs 39 when severed to provide water tight joints which may be cemented. Alternatively, the wall 21 may be slit so as to receive the webs 39 and permit the tubes 38 to remain connected to the line 37.

Assuming that each emitter unit is provided with eight emitters and a pair of emitter units are provided at each station in the emitter line. Then if an outlet is needed at each foot, the line between each emitter unit pair would be 16 feet. If the discharge point is intended to be adjacent the irrigation line, then it is merely necessary to cut the distributor tubes at 1 foot intervals. In this case, only 50 percent of the eight 16 foot long distributor tubes is used. This extra length may be utilized if it is desired to place outlet points laterally of the irrigation line; that is, appropriate lengths of distributor tubes may be stripped from the line and their ends placed at appropriate lateral locations.

In order to insure sufficient rise in pressure to effect transfer from flush to drip condition, the irrigation line may be extruded in a flat condition as indicated by 40. The initially flat condition of the irrigation line causes the emitter outlets within each housing 19 or pair of housings to progress from flush condition to drip condition in sequence assuming, of course that the capacity of the irrigation line exceeds the flush capacity of the emitters in a single corresponding housing or pair of housings. The concept of a normally collapsed emitter line or section thereof is more fully disclosed in my prior U.S. Pat. No. 3,779,468.

Reference is now directed to FIGS. 18 through 24. The construction here illustrated also provides a ring of outlets, however the drip or minimum flow passages direct the water against deflector surfaces to produce a spray pattern and, in this regard, is a further development of an embodiment shown in the aforementioned U.S. Pat. No. 3,779,468. The present embodiment of the emitter is intended to discharge one or more segmental sprays. For example, the emitter is divided into eight units, each arranged to discharge a spray subtending a 45° angle. By closing selected units, the spray pattern may range from 45° to a full circle in 45° increments.

More particularly, this embodiment includes a cylindrical housing 41 injection molded of rigid or semi-rigid plastic material. The housing is closed at one end, except for an inlet fitting 41a, and is provided with a set of longitudinally extending internal ribs 42. Received in the housing 41 is a resilient tubular sleeve 43 formed of rubber or other elastomeric material and having outwardly curving flute elements 44 of arcuate cross section separated by slits and received between the ribs 42. Any one or all of the flute elements serve as the resilient walls of corresponding discharge passages. The flute elements are joined together at their upper ends to form an annular sealing band 45 which overlies the upper end of the housing 41 including a radial portion and an axial portion. Fitted over the band 45 and upper end of the housing 41 is an annular retainer ring 46 having an upwardly and outwardly sloping top surface in the form of an obtuse cone.

Received over the retainer ring 46 is a cap 47 having an axially extending shell 48 fitting within the sleeve 43. In the construction illustrated, the emitter is provided with four active units and four inactive units, so as to discharge a half-circle spray pattern. Accordingly, one-half of the shell 48 is provided with four flute elements 49 which are convex to confirm to corresponding flexible flute elements 44, and four flute or fixed walls 50 which are concave; that is, curve in the opposite direction with respect to the corresponding flexible flute elements to form therewith flush passages of almond shape cross section. Each concave flute element 50 is provided with a minimum flow groove 51.

The portion of the cap 47 corresponding to the region of the shell 48 having the convex flute elements 49 forms a port circle flange 52 overlying and resting on the ring 46. The remaining portion of the cap 47 is provided with a complementary part circle flange 53 with underlying ribs 54. Between each pair of ribs 54, the underside of the flange 53 slopes upwardly with respect to the upperside of the ring 46 and is provided with a radially outwardly diverging flow directing recesses 55 having radially inner apeces continuing from the corresponding minimum flow grooves 51. The upper surface of the cap 47 may be embossed with triangles 56 to suggest the spray pattern.

The bottom of the housing 41 is provided with upwardly converging arms 57 terminating in a screwthreaded collar 58 and the center of the cap 41 is perforated to receive a screw 59 which secures the housing 41, sleeve 43, ring 46 and cap 47 together as a unit. The shell 48 and sleeve 43 terminate short of the bottom end of the housing 41 to provide access to the passageways formed by the concave flute elements 50 and corresponding flexible flute elements 44.

Operation of the embodiment shown in FIGS. 18 through 24 is as follows:

At the start of the irrigation cycle, upward flush flow occurs through the flush flow passage between the mutually concave walls formed by the flute elements 44 and 50 until a predetermined pressure differential across the flute elements 44 is produced whereupon the flute elements collapse limiting flow to the minimal flow grooves 51. This pressure differential may range between less than 1 pound or a few pounds, depending on the strength of the elastomer.

If it is desired to cause a mist discharge, the grooves 51 may be equal to the area provided for higher rates of drip or trickle flow. The water on striking the apex end of each recess 55 is caused to fan outwardly producing a mist spray. If it is desired to use the emitter as a sprayer, the dimensions of the grooves 51 are further increased.

Reference is now directed to FIG. 25. The embodiment here shown is intended for use as a drip or trickle emitter; however, the housing 41 and tubular sleeve 43 with its flute elements 44 are used. In place of the retainer ring 46 and cap 47, a cap 58 is provided. The cap includes a shell 48 having only concave flute elements 50. In place of the flange elements 52 and 53, a flange 60 is provided having an underlying profile corresponding to the ring 46. The cap 58 is provided with outlet ports 61 communicating with the flush flow passages and drip flow passages formed by the confronting concave flute elements 44 and 50. The outlet ports include tube receiving sockets 62 to receive a set of distributor tubes 63.

The embodiment shown in FIG. 5 is particularly suitable for attachment to the end of a hose for garden watering or to a side fitting provided on an irrigation supply line. If used in an orchard, one unit may be used for each tree to be irrigated. Initially, selected tubes may be closed, then as the tree grows the number of active tubes may be increased. Conveniently, this may be accomplished by tube loops of desired length extending between pairs of outlets, which may be severed as more outlets are needed.

It should be noted, that while it is preferred that both the fixed and flexible flutes have approximately the same and opposite curvature; the relative contours may vary substantially or one may be flat providing the desired area of the flush flow passage is maintained.

Unless restriction is provided continuously or at intervals in the irrigation supply line as disclosed in the aforementioned U.S. Pat. No. 3,779,468, the number of emitters that can be used in a given line is limited if full flushing is desired. That is, if too many emitters are in flush condition, the water pressure may not reach the one to three pounds required to collapse the emitters to drip flow.

The number of emitters may be increased by reducing the cross section of the passage when in flush flow condition. This may be accomplished by providing flexible flute elements 64 which curve toward rather than away from the flute elements 50 as shown in FIGS. 26 and 27. A particle too large to pass through the flush passage will lodge at the entrance end when the emitter is in drip flow; then, if the particle is not too large, when the pressure drops to produce flush flow, the force on the particle, though small may be sufficient to drive the particle through.

Having fully described my invention it is to be understood that I am not to be limited to the details herein set forth, but that my invention is of the full scope of the appended claims.

I claim:

1. An irrigation emitter comprising:
    a. a housing forming an enclosure having opposed first and second fixed walls, an inlet at one end thereof and an outlet at the opposite end thereof, the first wall having a longitudinally extending minimum flow groove communicating with the outlet;
    b. a longitudinally extending resilient wall interposed between the first and second walls and having at least one free lateral edge in contact with the first wall at one side of the minimum flow groove, the resilient wall being yieldably and progressively biased away from the first fixed wall between the free lateral edge and minimum flow groove to form with the first fixed wall a flush flow passage including the minimum flow groove and communicating between the inlet and outlet;
    c. the flexible wall forming with the second fixed wall, a pressure chamber communicating with the inlet and closed to the outlet creating, when subjected to pressure above a predetermined reduced pressure, a force deforming the flexible wall into conformity with the first wall and restricting flow to the minimum flow groove.

2. An irrigation emitter, as defined in claim 1, wherein:
    a. the resilient wall is provided with two free lateral edges engaging the first fixed wall along lines spaced laterally from the minimum flow groove.

3. An irrigation emitter, as defined in claim 1, wherein:
    a. the housing is tubular, the first wall is concave, and the first and second walls are joined;
    b. the flexible wall is provided with two free lateral edges freely contacting the lateral margins of the first fixed wall thereby to minimize the force required to deform the flexible wall.

4. An irrigation emitter, as defined in claim 1, wherein:
    a. a pair of housings are joined end-to-end and share a common inlet.

5. An irrigation emitter, as defined in claim 1, wherein:
    a. a plurality of housings are arranged in a circle with their circumferential margins joined to form a circular structure having a ring of outlets.

6. An irrigation emitter, comprising:
    a. a tubular housing having an inlet and an outlet at opposite ends and forming opposed walls therebetween joined at their lateral margins, one of the walls being concave and having a longitudinally extending minimum flow groove;
    b. and a longitudinally extending resilient partition wall interposed between the opposed walls and having lateral edges freely engageable with the concave wall, but otherwise spaced therefrom to form therewith a flush flow passage communicating between the inlet and the outlet;
    c. the resilient wall being responsive to a lower pressure in the flush flow passage and predetermined higher pressure on the opposite side of the resilient wall to cause surface contact between the concave wall and resilient wall and restrict flow to the minimum flow groove.

7. An irrigation emitter, as defined in claim 6, wherein:
    a. the tubular housing is oval shaped in cross section and includes a pair of telescoping housing elements;
    b. and a perforated seal element is interposed between the housing elements adjacent the outlet.

8. An irrigation emitter, as defined in claim 6, wherein:
    a. the tubular housing includes an angularly directed inlet tube having means for attachment to a flow line; and opposed clip elements intermediate the ends of the housing for receiving the flow line to clamp the housing at one side and longitudinally thereof.

9. An irrigation emitter, as defined in claim 6, wherein:
    a. a pair of housings are disposed in axial alignment and are provided with a common inlet tube attachable to a flow line, each housing being provided with opposed clip elements for receiving the flow line and securing the housing elements along side the flow line.

10. An irrigation emitter, comprising:
    a. an annular housing;
    b. a ring of flute elements forming fixed walls confronting the interior wall surface of the housing, the radially outer sides of selected flute elements being concave and each having a longitudinally extending minimum flow groove;
    c. a plurality of resilient partition walls, selected partition walls being interposed between the housing interior, wall surface and the selected flute elements, each selected partition wall having lateral edges engageable with the corresponding flute element, but otherwise spaced therefrom to form therewith a flush flow passage having a longitudinally spaced inlet and outlet;
    d. the selected resilient wall being responsive to a lower pressure in the corresponding flush flow passage and a predetermined higher pressure in the region between the flexible wall and the housing interior wall surface to cause surface contact between the resilient wall and the corresponding flute element and restrict flow to the minimum flow groove.

11. An irrigation emitter, as defined in claim 10, wherein:
    a. the selected flute elements and resilient walls form a complete circle.

12. An irrigation emitter, as defined in claim 11, wherein:
    a. distributor tubes are provided at the outlet ends of the flute elements.

13. An irrigation emitter, as defined in claim 11, wherein:
a. a ring of spray forming deflector elements are provided at the outlet ends of the flute elements, producing segments of a full circle spray pattern.

14. An irrigation emitter, as defined in claim 10, wherein:
a. less than the total number of flute elements are selected, the remaining flute elements are radially outward convex and are free of minimum flow grooves;
b. the corresponding flexible walls form seals closing flow between the ends of the convex flute elements;
c. and the spray forming deflector elements are provided at the outlet ends of the selected flute elements.

15. An irrigation emitter, as defined in claim 10, wherein:
a. the housing includes a central axial directed means for attachment to a supply line, and the outlets extend parallel and contiguous to the supply line;
b. and the supply line includes a set of peripheral tubes initially attached thereto but severable therefrom or perforable while remaining attached to permit selection of the points of discharge.

16. An irrigation emitter, as defined in claim 15, wherein:
a. a plurality of housings are installed in sequence along the supply line:
b. and the supply line is initially flat to cause progressive increase in pressure and corresponding progressive closure of flush flow passages in succeeding housings.

17. An irrigation emitter, as defined in claim 10, wherein:
a. the housing includes in the region of the inlets to the flush flow passages, a central axially directed means for attachment to a supply line, and a removable cap structure covering the region of the outlets from the flush flow passages; the cap structure forming axially directed means continuing from the outlets arranged for attachment to a plurality of distributor tubes.

18. An irrigation emitter, as defined in claim 10, wherein:
a. the housing includes in the region of the inlets to the flush flow passages a central axially directed means for attachment to a supply line, and a removable cap structure covering the region of the outlets from the flush flow passages; the cap structure forming deflecting means continuing from the outlets of the flush flow passages for producing a radially diverging spray pattern.

19. An irrigation emitter, comprising:
a. an essentially cylindrical housing structure having an inner wall and an outer wall forming an annular chamber, an end wall connecting the inner and outer wall and having an annular set of outlets, and means within the inner wall for axial connection to a supply line;
b. a ring having a set of radially outwardly directed concave flutes interposed between the inner and outer walls, each of the flutes having longitudinally extending minimum flow grooves communicating with corresponding outlets;
c. a cap covering the end of the housing opposite from the end wall and forming with the inner wall and fluted ring, a set of inlets communicating with the space between the fluted ring and the housing outer wall;
d. a seal ring interposed between the fluted ring and ported in communicating with the outlets;
e. resilient wall elements integral with the seal ring and extending therefrom in confronting relation with the flutes of the ring, each of the resilient wall elements having lateral portions engageable with a corresponding concave flute, but otherwise spaced therefrom to form therewith a flush flow passage between a corresponding inlet and outlet;
f. each resilient wall element being forced into surface contact with the corresponding concave flute in response to a predetermined pressure differential between the pressure in said chamber and the pressure in the corresponding flush flow passage, thereby restricting flow to the minimum flow groove.

20. An irrigation emitter, as defined in claim 19, wherein:
a. the supply line includes a ring of tubes extending longitudinally thereof and arranged for connection to a corresponding housing structure outlet; the tubes having outlet openings and detachable from the supply line for distributing the points of water discharge.

21. An irrigation emitter, comprising:
a. an essentially cylindrical housing structure having means at one end for connection to a supply line, the opposite end being open;
b. a ring of resilient flute elements extending axially within the housing;
c. a cap structure for the open end of the housing and including a ring of fixed flute elements extending into the housing and confronting the resilient flute elements;
d. each pair of selected confronting flute elements having a minimum flow groove extending longitudinally thereof;
e. each selected fixed flute element and a corresponding resilient flute element being in mutual contact along their lateral margins but spaced between their lateral margins to form a flush flow passage;
f. outlets for the flush flow passages in the cap structure;
g. inlets for the flush flow passages at the end portion of the housing structure remote from the cap structure;
h. the selected flexible flute elements being responsive to a preselected pressure differential between the pressure in the corresponding flush flow passages and the pressure in the housing to make surface contact with the corresponding fixed flute elements thereby to limit flow to the minimal flow grooves.

22. An irrigation emitter, as defined in claim 21, wherein:
a. the outlets are a ring of axially directed bores, each arranged to receive a distributor tube.

23. An irrigation emitter, as defined in claim 21, wherein:
a. the outlets include radially directed deflecting surfaces having apeces aligning with corresponding minimal flow grooves to produce a series of diverging spray patterns.

24. An irrigation emitter, as defined in claim 23, wherein:

a. the remaining fixed flute elements have facets conforming to the corresponding flexible flute elements in sealed relation thereto.

25. A self flushing emitter, comprising:
 a. a housing defining a chamber having an inlet and an outlet, adapted, on flow of water therethrough, to produce in the vicinity of the outlet, a region wherein the pressure is reduced with respect to the pressure in the chamber;
 b. a rigid wall member extending from the outlet into the chamber and having a longitudinally extending centrally disposed trickle flow channel therein;
 c. a flexible wall member extending from the outlet in confronting relation to the rigid wall member;
 d. the side margins of the wall members being in longitudinally extending mutual contact and at least the rigid wall member being arched transversely to form between the wall members a laterally enclosed essentially uniform flush flow passage of greater dimension along the central portions of the confronting wall members and diminishing therefrom laterally to the mutually contacting side margins;
 e. one end of the flush flow passage being connected with the region of reduced pressure whereby, upon flow of water through the flush flow passage at a predetermined rate, the pressure differential of the water in the flush flow passage and in the chamber causes collapse of the flexible wall member against the fixed wall member on opposite sides of the trickle flow channel to confine the flow of water to the trickle flow channel;
 f. the flexible wall member being yieldably biased in a direction to form the flush passage, whereby, upon reduction of pressure in the chamber below a predetermined value, the flexible wall member re-establishes the flush flow passage.

26. An irrigation emitter, comprising:
 a. a housing forming an enclosure having axially extending opposed first and second walls;
 b. an axially extending resilient wall interposed between the first and second walls;
 c. the first wall and resilient wall defining an axially directed flush flow passage having relatively arched surfaces, the resilient wall having at least one lateral margin in free contact with the first wall forming a lateral margin of the flush flow passage;
 d. one of the surfaces of the flush flow passage having an axially extending minimum flow groove of substantially smaller dimensions than the flush flow passage;
 e. the flexible wall forming with the second wall a pressure chamber, the flush flow passage and minimum flow passage having an axially directed common inlet communicating with the pressure chamber, and a common axially spaced outlet through the first wall;
 f. the flexible wall being responsive to a predetermined lower pressure in the flush flow passage than in the pressure chamber to collapse into surface-to-surface contact with the first wall and restrict flow to the minimum flow groove.

27. An irrigation emitter, as defined in claim 26, wherein:
 a. a pair of housings are joined end-to-end and share a common inlet.

28. An irrigation emitter, as defined in claim 26, wherein:
 a. a plurality of housings are arranged in a circle with their circumferential margins joined to form a circular structure having a ring of outlets.

29. An irrigation emitter, comprising:
 a. an enclosure having an axially extending wall;
 b. an axially extending resilient wall confronting a region of the enclosure wall;
 c. the enclosure wall region and resilient wall defining an axially directed flush flow passage, the resilient wall having at least one lateral margin in free contact with the enclosure wall region forming a lateral margin of the flush flow passage;
 d. one of the surfaces of the flush flow passage having a minimum flow groove;
 e. the flexible wall forming with the remaining enclosure wall a pressure chamber, the flush flow passage and minimum flow passage having inlets communicating with the pressure chamber, and a common outlet through the enclosure wall region;
 f. the flexible wall being responsive to a predetermined lower pressure in the flush flow passage than in the pressure chamber to collapse into surface-to-surface contact with the enclosure wall thereby to restrict flow to the minimum flow groove.

30. An irrigation emitter, as defined in claim 31, wherein:
 a. the resilient wall is provided with two free lateral edges engaging the enclosure wall region along lines spaced laterally from the minimum flow groove.

31. An irrigation emitter, as defined in claim 29, wherein:
 a. the enclosure is tubular;
 b. the resilient wall is provided with two free lateral edges freely contacting the lateral margins of the enclosure wall region thereby to minimize the force required to deform the resilient wall.

* * * * *